United States Patent [19]
Goldstein et al.

[11] Patent Number: 5,861,193
[45] Date of Patent: Jan. 19, 1999

[54] LOW VISCOSITY POLYURETIDIONE POLYURETHANES AND THEIR USE AS CURATIVES FOR SOLVENT AND WATER BORNE COATINGS

[75] Inventors: Stephen L. Goldstein, Glen Mills, Pa.; James M. O'Connor, Branford, Conn.; Donald L. Lickei, Wayne, Pa.; Henry G. Barnowski, Jr., Durham, Conn.; Willard F. Burt, Bristol, Conn.; Ronald S. Blackwell, Waterbury, Conn.

[73] Assignee: Arco Chemical Technology, L.P., Greenville, Del.

[21] Appl. No.: 134,610

[22] Filed: Aug. 14, 1998

Related U.S. Application Data

[62] Division of Ser. No. 920,494, Aug. 29, 1997, Pat. No. 5,814,689.

[51] Int. Cl.[6] .............................. B05D 3/02; C08G 18/06; C08G 18/10; C08G 18/80
[52] U.S. Cl. .................................. 427/385.5; 427/388.2; 528/45; 528/59
[58] Field of Search ............................ 427/385.5, 388.2; 528/45, 59

[56] References Cited

U.S. PATENT DOCUMENTS

| | | |
|---|---|---|
| 3,099,642 | 7/1963 | Hollschmidt et al. . |
| 3,248,370 | 4/1966 | Relschl et al. . |
| 3,290,288 | 12/1966 | Oertel et al. . |
| 3,524,834 | 8/1970 | Allport et al. . |
| 3,793,238 | 2/1974 | Winkelmann et al. . |
| 3,998,794 | 12/1976 | Muller et al. . |
| 4,413,079 | 11/1983 | Disteldorf et al. . |
| 4,463,154 | 7/1984 | Disteldorf et al. . |
| 4,483,798 | 11/1984 | Disteldorf et al. . |
| 4,614,785 | 9/1986 | Richter et al. . |
| 5,391,686 | 2/1995 | Jadhau et al. ............... 422/388.2 X |
| 5,492,731 | 2/1996 | Temple et al. ............... 427/388.2 X |

FOREIGN PATENT DOCUMENTS

| | | |
|---|---|---|
| A-70272/94 | 3/1995 | Australia . |
| 802189 | 10/1958 | United Kingdom . |

*Primary Examiner*—Michael Lusignan
*Attorney, Agent, or Firm*—Dale Lynn Carlson; Wiggin & Dana

[57] ABSTRACT

The present invention relates to the preparation and use of novel polyurethane polyuretidione crosslinking agents in solvent and water borne coatings systems. These polyuretidione polyurethanes are characterized by their relatively low solution viscosity, and the ability to provide a relatively high crosslink density in the final, cured film, and thereby, coatings with the excellent physical properties and resistance to chemical and environmental exposure of known polyurethane systems without the potential for worker exposure to toxic isocyanates. This invention also relates to a process for the production of these polyuretidiones and their use in pseudo-one and two component coating compositions.

13 Claims, No Drawings

LOW VISCOSITY POLYURETIDIONE POLYURETHANES AND THEIR USE AS CURATIVES FOR SOLVENT AND WATER BORNE COATINGS

CROSS-REFERENCE TO RELATED APPLICTAION

This is a division of application Ser. No.. 08/920,494, that was filed Aug. 29, 1997, now U.S. Pat. No. 5,814,689, and is incorporated herein by reference in its entirety.

FIELD OF THE INVENTION

This invention relates generally to uretidione-containing curatives for solvent and water-borne coatings, and, more specifically, to polyuretidione polyurethanes having a relatively low solution viscosity that provide a relatively high crosslink density in the resulting cured coating.

BACKGROUND OF THE INVENTION

Polyurethane-forming compositions are widely used in a variety of commercial, industrial and household applications, such as in automotive clear-coat and seat cushion applications. There is a significant environmental challenge facing the polyurethanes manufacturing industry due to the potential for worker exposure to toxic isocyanates. In order to overcome this challenge, polyurethane systems have been prepared heretofore that employ isocyanates that are pre-reacted with monofunctional reagents to form relatively thermally labile compounds, called blocked isocyanates. Unfortunately, the monofunctional reagents (commonly referred to as "isocyanate blocking agents") are released into the air, upon heating the blocked isocyanate, in order to free-up the functional iscyanate moiety, during curing of the polyurethane-forming composition to prepare the desired polyurethane product. During this curing step, special precautions must be taken to avoid release of these volatile blocking agents into the air (or a waste air stream) in order to protect both workers and the environment.

As an alternative to the use of systems requiring these volatile blocking agents, there are other compounds, namely uretidiones, that are, in effect, "self-blocked", thus providing the desired "latent reactivity" to enable the uretidione linkages to react at the desired time, while avoiding the above-discussed environmental problems associated with the use of volatile blocking agents. The prior art has recognized that there are advantages associated with this latent reactivity, but has failed to make practical application of this concept. By way of illustration, disclosures of the preparation of crosslinkable polyurethane rubbers and elastomers by taking advantage of the latent reactivity of the uretidione linkage can be found in U.S. Pat. Nos. 3,099,642 and 3,248,370, and in British Patent No. 802,189. The processes described in these references involve the combining, at temperatures of less than 100° C., of a relatively high molecular weight (e.g., on the order of from 500 to 3,000 daltons) difunctional resin, a low molecular weight crosslinker reagent, and a uretidione diisocyanate, or a mixture of a uretidione diisocyanate and a monomeric diisocyanate. The preferred uretidiones disclosed in these references are derived from aromatic diisocyanates. The resulting, essentially thermoplastic, formulations contain an excess of isocyanate reactive groups, and these formulations are finally cured to a crosslinked thermoset polymer by treatment at relatively high temperatures for relatively extended periods of time.

Similarly, U.S. Pat. No. 3,793,238 discloses a process for preparing filaments and foils by casting very high molecular weight polyurethanes, derived from high molecular weight polyester diols and aromatic uretidione diisocyanates, from very polar solvents. The final products are crosslinked by exposure to primary or secondary aliphatic diamines or hydrazine or hydrazides.

U.S. Pat. No. 3,524,834 teaches a method of using aromatic uretidione diisocyanates to convert thermoplastic copolymers, derived from mono-ethylenically unsaturated monomers and a minor amount of a co-monomer that contains an amide ($-CONH_2$) group, into a crosslinked thermoset polymer with heat.

For powder coating systems, the preparation and use of solid, high molecular weight polyuretidione polyurethane curatives, derived from (cyclo)aliphatic diisocyanates and relatively low molecular weight diols, is described in U.S. Pat. Nos.: 4,413,079; 4,463,154; and, 4,483,798; and, in Australian Patent No. A-70,272/94. This last reference teaches the low melt viscosity advantages associated with the use of diols containing carboxylic acid ester and/or carbonate groups in a total amount of at least one percent in the powder coating composition described therein. These diols containing carboxylic acid ester and/or carbonate groups are more expensive than might otherwise be desired.

For solvent-borne coatings systems, polyuretidione based curatives are described in U.S. Pat. No. 3,998,794. These curatives are crosslinkable polyurethane polyurea oligomers containing uretidione groups prepared by chain extending polyisocyanates, containing aliphatically bound uretidione and isocyanate groups, with aliphatic primary and/or secondary diamines. Unfortunately, because the uretidione structures are linked by urea groups, the oligomers that are described in the '794 patent which contain sufficiently high levels of uretidione rings to provide the desired curing also are relatively high in viscosity. Therefore, undesirably high levels of solvents must be used in admixture with these oligomers in order to prepare sprayable coatings formulations.

Thus, while the potential utility and advantages associated with this latent reactivity of uretidiones are known, as illustrated by the disclosures provided in the above-discussed prior art patents, the application of this technology in practical commercial solvent and water borne systems has been lacking heretofore, based upon the knowledge of the present inventors. The reason for this failure in the prior art to find practical commercial application is a lack of understanding being exhibited heretofore regarding how to prepare and use uretidione containing oligomers having the proper balance of uretidione content and chain length in order to achieve materials with useful handling characteristics (notably, viscosity), while providing the needed crosslink density, in order to yield the desired properties in the final, cured polymer.

Accordingly, it would therefore be highly desirable to provide, as a polyurethane-forming cross-linker, a polyuretidione composition having a proper balance of uretidione content and chain length in order to produce a desired combination of properties, including a low solution viscosity, together with a high crosslink density in the final, cured polymer. Such a combination would result in a coating having the desirable performance properties of conventional polyurethane coatings, but without the above-discussed environmental hazards associated with the isocyanates conventionally employed to produce polyurethane coatings. Advantageously, the polyuretidione composition would be useful for producing coatings and elastomers in both solvent-borne and water-borne coatings systems, and would not employ the relatively expensive diols containing carbonate or carboxylic acid ester groups as described in the prior art. The present invention provides one such composition, together with a process for making and using the composition.

SUMMARY OF THE INVENTION

This invention relates to novel curatives, and a process for their preparation and use, for use in curing high performance, solvent and water borne coatings and elastomers. Thus, in one aspect, the present invention relates to a polyuretidione polyurethane composition that is free of carbonate groups and carboxylic acid ester groups, said composition comprising, based on the weight of the polyuretidione polyurethane:

(a) from 5% to 20%, by weight, of uretidione groups, calculated as $(NCO)_2$ having a molecular weight of 84, (b) from 10 to 30%, by weight, of urethane groups, calculated as $NHCO_2$ having a molecular weight of 59, (c) less than 2%, by weight, of free isocyanate groups, calculated as NCO having a molecular weight of 42, and (d) less than 7%, by weight, of isocyanurate groups, calculated as $(NCO)_3$ having a molecular weight of 126.

In another aspect, the present invention relates to the above-describe polyuretidione polyurethane composition that is further characterized by having: (i) an average of 3 to 10 uretidione rings per oligomer chain; and, (ii) less than 1 mol percent of oligomer chains containing one or fewer uretidione rings.

In still another aspect, the present invention relates to a process for preparing the above-described polyuretidione polyurethane compositions by reacting, at an equivalent ratio of isocyanate groups to hydroxyl groups of 1.0:1 to 0.7:1, a reaction mixture comprising:

(A) a uretidione group-containing polyisocyanate having an average isocyanate functionality of between 2.0 and 2.4, (B) a diol, or a mixture of diols, that is free of carbonate groups and free of carboxylic acid ester groups, and has an average molecular weight of more than 76 but less than 676, with the proviso that, of the hydroxyl groups present, more than 40% of them are secondary hydroxyl groups or are in a position alpha to an alkyl chain branch point, and (C) not more than 40% by weight of mono-hydroxyl compound, based on the total weight of components (B) and (C) in said reaction mixture.

In still another aspect, the present invention relates to coating compositions comprising an active hydrogen-containing component and the above described polyuretidione polyurethane composition.

In yet another aspect, the present invention relates to a method of coating a substrate which comprises contacting the substrate with a coating composition containing the above-described polyuretidione polyurethane composition as a curative component in pseudo-one or two component coating compositions.

These and other aspects will become apparent upon reading the following detailed description of the invention.

DETAILED DESCRIPTION OF THE INVENTION

It has now been found, in accordance with the present invention that polyuretidione polyurethanes are suitably provided, in accordance with the present invention, with oligomer chains having a high average uretidione content. In a coating composition, these polyuretidione polyurethanes provide an advantageous combination of maintaining a reduced viscosity, providing improved solvent and uretidione reactive resin compatibility, and affording a minimum amount of oligomer molecules in the formulation having one or less uretidione rings. Unexpectedly, these compositions can be practically used to prepare elastomeric coatings and films having the desirable high performance properties of conventional polyurethane coatings. This result is particularly surprising in view of disclosures like that provided in the above-discussed Australian Patent A-70,272/94, inasmuch as these objectives can be achieved without employing the expensive diols containing carboxylic acid ester and/or carbonate groups that are required by the teachings of this Australian patent.

Without wishing to be bound by any particular theory, it is believed by the present inventors that the cure mechanism of the polyuretidione polyurethanes of the present invention is based upon the latent reactivity of (cyclo)aliphatic uretidione (isocyanate dimer) structures. These curatives are suitably employed in a wide variety of polyurethane-forming systems in the preparation of elastomers and coatings having excellent physical properties, as well as resistance to the elements during chemical and environmental exposure. Further, the use of the curatives of the present invention avoids the risk of worker exposure to toxic isocyanates that tends to be present when using the above-described prior art compositions.

In accordance with the present invention, the term "monouretidione" means a polyisocyanate or polyurethane oligomer molecule containing one uretidione group and the term "polyuretidione" means a polyisocyanate or polyurethane oligomer molecule containing more than one uretidione group. The term "(cyclo)aliphatically bound isocyanate groups" means isocyanate groups that are bound directly to an aliphatic and/or cycloaliphatic group. The term "conversion" means that portion of the reaction mixture that is not starting polyisocyanate. And, the term "pseudo-one component coating formulation" refers to an essentially complete and stable coating composition, to which only a catalyst need be added before application.

Examples of suitable diisocyanates that can be used as starting materials for preparing the polyuretidione polyurethanes according to the present invention are organic diisocyanates represented by the formula $R(NCO)_2$ wherein R represents an organic group obtained by removing the isocyanate groups from an organic diisocyanate having (cyclo)aliphatically bound isocyanate groups and a molecular weight of 112 to 1000, preferably 140 to 400. Preferred diisocyanates for the process according to this invention are those represented by the formula wherein R represents a divalent aliphatic hydrocarbon group having from 4 to 18 carbon atoms, a divalent cycloaliphatic hydrocarbon group having from 5 to 15 carbon atoms, or a divalent araliphatic hydrocarbon group having from 7 to 15 carbon atoms. Examples of the organic diisocyanates which are particularly suitable for this process include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3- isocyanatomethyl-3,5,5-trimethyl cyclohexane (isophorone diisocyanate or IPDI), bis-(4-isocyantocyclohexyl)methane, 1,3- and 1,4-bis(isocyanatomethyl)-cyclohexane, bis-(4-isocyanato- 3-methyl-cyclohexyl)-methane, a,a,a',a'-tetramethyl-1,3- and/or 1,4-xylene diisocyanate, 1-isocyanato-1-methyl-4(3)-isocyanato-methyl cyclohexane, and 2,4- and/or 2,6-hexahydro-toluene diisocyanate Mixtures of diisocyanates may also be used. Preferred diisocyanates are 1,6-hexamethylene diisocyanate, isophorone diisocyanate, and bis(4-isocyanatocyclohexyl)-methane because they are readily available and yield relatively low viscosity polyuretidione polyurethane oligomers. 1,6-Hexamethylene diisocyanate is especially preferred, either alone or as the primary constituent of a mixture of diisocyanates.

These (cyclo)aliphatic diisocyanates are conveniently converted into uretidione diisocyanates by well known catalytic processes. Dimerization catalysts include tertiary phosphines, for example the compounds mentioned in U.S. Pat. No. 4,614,785, column 4, lines 11–47, herein incorporated by reference. Tributyl phosphine and trioctyl phosphine are the preferred tertiary phosphine catalysts. Also suitable are peralkylated acid triamides such as those described by U.S. Pat. Nos. 3,290,288 and 4,614,785. A specific example would be tris(dimethylamino)phosphine.

Other suitable dimerization catalysts are 4-dialkylaminopyridines and 4-(N-arylalkyl-N-alkyl) aminopyridines. These catalysts have the structure Pyr-NR1R2 (I) where Pyr is a 4-pyridinyl residue and R1 and R2 are, independently from one another, C1 to C6 alkyl or C7 to C12 arylalkyl groups, or R1 and R2, taken together with the attached nitrogen, form a ring which may contain other heteroatoms, such as oxygen, nitrogen, or sulfur, to give, for example, pyrrolidine, piperidine, or morpholine residues. Common examples of 4-dialkylamino pyridines are 4-dimethylaminopyridine (referred to as DMAP), where structures R1 and R2 are both $CH_3$, and 4-pyrrolidinylpyridine, where structures R1 and R2, taken together, are $(CH_2)_4$. 4-(N-arylalkyl-N-alkyl)-aminopyridines are exemplified by 4-(N-benzyl-N-methyl) aminopyridine (referred to as BMAP), where structure R1 is $CH_2C_6H_5$ and R2 is $CH_3$. Another class of useful dimerization catalysts are alkylated imidazoles such as 1,2-dimethylimidazole.

Polymer- or silica-bound versions of the above catalysts are also possible. These insoluble catalysts are preferable because no catalyst poison is needed and no catalyst residues of any kind are left in the product solution or the final purified product.

In the preparation of polyuretidione polyisocyanates suitable for the processes according to this invention, the reaction is carried out at a temperature of 20° C. to 95° C., more preferably, about 60° C. to about 85° C. The preferred trialkyl phosphine catalysts are generally used in a quantity of about 0.01% to 3% by weight, more preferably from 0.1% to 2% by weight, based upon the quantity of starting diisocyanate. These catalysts also form minor amounts of isocyanurates (isocyanate trimers) during the dimerization reaction. While not desirable, because they tend to increase the viscosity of the polyuretidione polyurethanes prepared from them, small amounts, preferably less than 20 mole percent of the oligomers present in the product uretidione-containing polyisocyanate mixture, are not detrimental to the performance of the compositions of this invention. Thus, in the preferred preparation of these polyuretidione polyisocyanates, the reaction is only allowed to run to relatively low conversions, preferably 20 to 40%, more preferably 25 to 35% conversion. This will minimize the isocyanurate content of the uretidione-containing product mixture.

Once the desired level of conversion is reached, the dimerization reaction is generally stopped by the addition of a reagent which destroys the activity of the catalyst. Suitable poisons for the phosphine catalysts are, for example: sulfur; oxidants such as oxygen, ozone, hydrogen peroxide, alkyl hydroperoxides, and alkyl peroxides; alkylating agents such as dimethyl sulfate, p-toluene sulphonic acid methyl ester; sulfonyl isocyanates of the type disclosed in U.S. Pat. No. 4,614,785, column 5, line 27 to column 6, line 35, herein incorporated by reference; and, halogen based acids of the form HX, where X is a halogen such as chlorine or bromine. The same catalyst poisons may be used with the amine catalysts, with the exception of sulfur and the oxidants. Low molecular weight catalysts or poisoned catalysts may also be removed by distillation from the product solution and/or the product.

Generally, after termination of the reaction, the major portion of the excess, unreacted starting diisocyanate is removed in a know manner. Distillation may be carried out, for example, in vertical pipe evaporators or thin layer evaporators conventionally used for this purpose. The product obtained should generally contain a residue of monomeric starting diisocyanate of less than 2%, preferably less than 0.5% by weight.

In a less preferred embodiment of this invention, it is possible to use the crude uretidione containing polyisocyanate reaction mixture containing the excess, unreacted starting diisocyanate or the crude uretidione containing polyisocyanate reaction mixture where only a portion of the excess, unreacted starting diisocyanate is removed. However, polyuretidione polyurethanes derived from such intermediates are higher in urethane content (and viscosity) and lower in uretidione content than is desirable.

Suitable polyuretidione polyisocyanates may be prepared from a blend of (cyclo)aliphatic diisocyanates to give a mixed polyuretidione polyisocyanate or they may be prepared by blending polyuretidione polyisocyanates from different diisocyanates that are synthesized, separately. This permits the beneficial modification of some of the properties of the final, cured film to impart, for example, improved hardness, reduced drying time and improved solvent resistance.

The disclosures of U.S. Pat. No. 5,461,135 suggest an advantageous route to polyuretidione polyisocyanates that are suitable precursors to certain classes of polyuretidione polyurethanes of this invention. For example, when a hydrophilic polyuretidione polyurethane is desired that is terminated by a poly(ethylene oxide) mono-alkyl ether residue representing 2 to 35%, preferably 5 to 15%, of the weight of the polyuretidione polyurethane, and, that is free of urethane catalysts and their residues, it is found that the relatively high molecular weight poly(ethylene oxide) mono-alkyl ether mono-alcohols react very slowly with polyuretidione polyisocyanates. The modification of the above described dimerization process to include the addition of a mono-alcohol, and thereby the simultaneous formation of uretidione polyisocyanates and incorporation of the hydrophile as an allophanate polyisocyanate, can considerably shorten overall synthesis times.

Thus, in this modified uretidione formation process, though less preferred, the mono-alcohol may be added, at once, to the reaction vessel immediately after the addition of the catalyst. More preferred is to add the mono-alcohol, slowly, after the catalyst has been added and the dimerization reaction has commenced. It is preferable that the dimerization proceed to about 1 to 20% conversion, most preferably, about 4 to 10% conversion, before the alcohol is added. The preferred rate, to minimize carbamate formation, at which the mono-alcohol should be added to the reacting system is dependent on the reaction temperature, catalyst level and the solubility of the mono-alcohol in the diisocyanate. At the preferred temperatures and catalyst levels described above, addition rates of about 0.1 to 1.0 milliequivalents of alcohol per gram of the initial diisocyanate charge are useful. More preferred are addition rates in the range of 0.1 to 0.5 milliequivalents of alcohol per gram of the initial diisocyanate charge. Generally, it has been found that urethane formation is minimized if the alcohol is added at such a rate that the uretidione content of the system, as measured by IR, does not decrease, more preferably, increases slowly, during the addition.

Generally, the reaction is carried out until the desired degree of oligomerization has been achieved, as described above. However, it is preferable to continue the reaction for a period of time after the completion of the mono-alcohol addition step to insure that all of the added alcohol has been consumed. Any hydroxyl present in the system upon termination of the reaction will be converted to carbamate groups during work-up. Depending on the reactivity of the hydroxyl groups and the addition rate, post alcohol addition reaction times of at least 0.5 to 1.0 hours are preferred. Of course, longer times can be used depending on the degree of oligomerization desired. The reaction is terminated and stripped of unreacted diisocyanate monomer as described above.

The product of this modified process incorporates poly (ethylene oxide) mono-alkyl ether residues as allophanate molecules and a lesser amount of urethane molecules. In principle, their presence should give a lower density of uretidione groups and higher levels of mono-(uretidione) functional oligomers compared to a polyuretidione polyurethane derived from a conventional polyuretidione polyisocyanate. However, on a molar basis the preferred use levels of poly(ethylene oxide) mono-alkyl ether residue (5 to 15%, of the weight of the polyuretidione polyurethane) for waterborne coatings, represent only a small portion of the reactive sites in the system. Therefore, the overall performance of the products by the two processes are virtually indistinguishable. However, practically, this modified process is less flexible than is desirable in that a variety of intermediate products would need to be manufactured and stored.

The uretidione containing polyurethanes of the present invention are prepared by the reaction of (cyclo)aliphatic alcohols with the above described polyuretidione polyisocyanates. Examples of suitable linear, cyclic, or branched polyalcohols include: ethanediol; 1,2- and 1,3-propanediol; 1,2- and 1,3-butanediol; 1,4- and 1,5-pentanediol; neopentyl glycol; 1,6- and 2,5-hexanediol; 3-methyl-pentane-1,5-diol; 2-methyl-2-propylpropane-1,3-diol; 2,2-dimethylpropane-1, 3-diol; 2-ethylhexane-1,3-diol; 2,2,4-trimethylpentane-1,3-diol; trimethylhexane-1,6-diol; 1,10-decanediol; 1,12-dodecanediol; diethylene glycol; triethylene glycol; dipropylene glycol; tripropylene glycol; 1,2,6-hexanetriol; trimethylolethane; trimethylol propane; glycerine; pentaerythritol; and 1,2- thru 1,4-cyclohexanediol.

It is also possible to use polyether polyalcohols to prepare products of this invention. The polyether polyalcohols useful in this invention have at least two hydroxyl groups and may, as an example, be prepared by the polymerization of ethylene oxide, propylene oxide, butylene oxide, or epichlorohydrin in the presence of a suitable polymerization catalyst, by their addition to starting components having reactive hydrogen atoms. Suitable starting components include ethylene glycol, 1,3- and 1,2-propylene glycol, trimethylolpropane, and glycerin. It is possible to use mixtures of the polymerizable groups and/or starting components.

It is also possible in accordance with the present invention to use mixtures of the above polyalcohols to achieve the benefits described. Where the compositions of this invention are to be used in water borne applications, polyalcohols containing: poly(oxyethylene) chains; pyrrolidinone groups, such as N-(2,3-dihydroxypropyl) pyrrolidinone; and/or easily ionized functional groups, such as dimethylol propanoic acid, are preferred.

Generally, it is found that only small amounts (less than 10 mol percent of the hydroxyl groups present in a polyalcohol mixture) of triols and higher functionality polyalcohols can be used, otherwise the viscosity and solvent compatibility of the resulting polyuretidione polyurethanes is adversely affected. Similarly, as the molar concentration of primary hydroxyl groups is increased, the viscosity increases and the solvent compatibility is decreased. It is preferred that at least 40% of the hydroxyl groups in the polyalcohol or mixture of polyalcohols used to prepare the polyuretidione polyurethanes of this invention should be secondary hydroxyl groups or are in a position alpha to an alkyl chain branch point.

The preferred average equivalent weight of the polyalcohol or mixture of polyalcohols used to prepare the polyuretidione polyurethanes of this invention is in the range of about 38 to about 338. only small amounts of diols such as ethylene and propylene glycol can be used without increasing the viscosity and decreasing the system compatibility of the resulting polyuretidione polyurethanes. The use of high molecular weight polyalcohols dilutes the uretidione content of the product. In addition, if the desired objectives of an average of greater than 3 uretidione rings in the oligomer chains and a minimization of the number of oligomers containing one or fewer uretidione rings are to be achieved, a very high molecular weight, high viscosity product would have to be prepared.

The ratio of polyalcohol hydroxyl groups to isocyanate groups is a critical variable in the preparation of useful products of this invention. For a given polyalcohol, this ratio controls the viscosity of the product as well as the average uretidione content of the oligomer chains. This, in part, controls the crosslink density of the final, cured film. At a ratio of 1:1, a high polymer will be formed. At a ratio of 2:1, the product will be low in viscosity, but with an average of only somewhat more than one uretidione ring per oligomer chain, it will provide insufficient crosslink density to give a high performance film. Thus, generally, a minimum ratio of 3:2, to give an average of more than two uretidione rings per oligomer chain, is required to prepare films with good properties. Generally, it is found that ratios above 11:10 yield products with viscosities that are too high to be useful. Thus, the preferred hydroxyl group to isocyanate group ratios are in the range of 3:2 to 9:8 and the most preferred ratios are from about 4:3 to about 7:6. These provide hydroxyl terminated oligomers with a good balance of average uretidione content and viscosity.

The terminal hydroxyl groups of these polyuretidione polyurethanes provide improved compatibility with some polar solvents and coreactant resins, especially in water borne coatings formulations. Alternatively, to provide better compatibility with components in relatively low polarity solvent borne systems, (cyclo)aliphatic mono-ols can be used to prepare (cyclo)aliphatic residue terminated polyuretidione polyurethanes of this invention. When mono-ols are used, the ratios of polyalcohol hydroxyl groups to isocyanate groups are somewhat different. In an example embodiment of the process for the synthesis of these materials, a polyalcohol or a mixture of polyalcohols is reacted with the uretidione polyisocyanate to give an oligomeric mixture of isocyanate terminated polyuretidione polyurethanes. In principle, polyalcohol hydroxyl group to isocyanate group ratios of more than 0.5:1 and less than 1:1 can be used. However, the amount of polyalcohol used must give a balance between the viscosity of the intermediate product and the residual monomeric uretidione diisocyanate (i.e., species containing only one uretidione ring in the oligomer chain) content. Generally, it is found that polyalcohol hydroxyl group to isocyanate group ratios of more than 0.6:1 and less than 0.9:1 are preferable, while ratios of more than 0.65:1 and less than 0.85:1 are most preferable, as they, after the remaining isocyanate groups are capped with a (cyclo) aliphatic mono-ol, give (cyclo)aliphatic residue terminated compositions with useful viscosities and low levels of mono-(uretidione)functional oligomers. Thus, to provide useful polyuretidione polyurethanes of this invention, no more than 40% by weight, based on the total weight of polyalcohols plus mono-ols, should be mono-ols.

Each molecule of said mono-ol may contain between 1 and 40 carbon atoms and has a molecular weight of between 32 and about 2500. Examples of suitable linear, cyclic, or branched monoalcohols include methanol; ethanol; 1- and 2-propanol; 1- and 2-butanol; 1-, 2- and 3-pentanol; 1-, 2- and 3-hexanol; 3-methyl-pentanol; 2-ethylhexanol; 1-octanol; 1-decanol; 1-dodecanol; and 1-cyclohexanol.

It is also possible to use ether-group containing monoalcohols to prepare products of this invention. Useful polyether monoalcohols may, as an example, be prepared by the polymerization of ethylene oxide, propylene oxide, butylene oxide, or epichlorohydrin in the presence of a suitable polymerization catalyst, by their addition to starting components having reactive hydrogen atoms. Suitable starting components include those listed above, such as: methanol, ethanol, propanol, butanol and phenols. It is possible to use mixtures of the polymerizable groups and/or starting components.

Also suitable for the present invention are fatty alkyl monoalcohols or fluorinated monoalcohols, particularly where at least 2 contiguous carbons are fully fluorinated. Such monoalcohols will impart water or oil repellent characteristics to the final coating. Other products, such as RIM or cast elastomeric products, made from the products of this invention which incorporate fatty alkyl monoalcohols or fluorinated monoalcohols, particularly where at least 2 contiguous carbons are fully fluorinated, will derive similar benefits in addition to imparting the characteristics of an internal mold release agent.

Monoalcohols containing functional groups not reactive with alcohol or isocyanate groups are also highly desirable. Examples would include monoalcohols containing acrylate, methacrylate, allyl, propenyl, acetyl, vinyl ether, norbornyl, cyanoacrylic, bismaleimide, and other polymerizable groups which would provide such added benefits as dual-, post- or pre-cure methods of coating hardening. Similar benefits could also be extended to other applications besides coatings, such as adhesives, sealants and RIM, and cast elastomers.

It is also possible in accordance with the present invention to use mixtures of the above monoalcohols to achieve the benefits described. Where the compositions of this invention are to be used in water borne applications, alcohols containing: poly(oxyethylene) chains; pyrrolidinone groups, such as N-(2-hydroxyethyl) pyrrolidinone; or, acidic functionalities, such as hydroxyacetic acid, are preferred.

The ratios of the above described uretidione polyisocyanates to alcohols are chosen, in accordance with the present invention, such that the resulting polyuretidione polyurethane compositions contain, based on the weight of the polyuretidione polyurethane, 5 to 20%, more preferably 7 to 17%, by weight, of uretidione groups (calculated as $(NCO)_2$; molecular weight=84). The content of urethane groups (calculated as $NHCO_2$; molecular weight=59), is preferably 10 to 30%, more preferably, 15 to 27% by weight. It is preferred that the composition contain less than 2%, by weight, of free isocyanate groups (calculated as NCO; molecular weight=42), more preferably less than 1%, most preferably, less than 0.2% NCO groups. The preferred level of isocyanurate groups is less than 7%, by weight (calculated as $(NCO)_3$; molecular weight=126), more preferable, are products containing less than 5% isocyanurate.

In accordance with the present invention, the selection of the amounts of the above described uretidione polyisocyanates and alcohols typically result in polyuretidione polyurethane compositions having, preferably, an average of 3 to 10, more preferably, 4 to 8 uretidione rings per oligomer chain. In addition, the polyuretidione polyurethane compositions of this invention should have less than 1 mol percent of oligomer chains containing one or fewer uretidione rings, that is the combination of bisurethanes arising from monomeric uretidione diisocyanates and trisurethanes arising from monomeric isocyanurate and uretidione isocyanurate triisocyanates.

The polyuretidione polyurethanes of the present invention are prepared by the reaction of the above described (cyclo) aliphatic alcohols with the above described polyuretidione polyisocyanates at elevated temperatures. While this reaction can be carried out in absence of a solvent, it is preferable to use a solvent because of the ease of handling a reduced viscosity material. The solvents to be used in this process must not be reactive with isocyanates nor with alcohols. The preferred solvents are those which are commonly used in solvent and water borne coatings formulations, including: dioxane; esters such as ethyl acetate or butyl acetate; aromatics, such as toluene or xylenes; ketones such as acetone, methyl ethyl ketone, methyl amyl ketone, methyl isobutyl ketone, or cyclohexanone; ethers, such as diisopropyl ether; and, alkanes such as cyclohexane, petroleum ether, or ligroin.

Generally, the use of ketones, esters and/or ethers is preferred because of their excellent compatibility with the reactants and the products. The amount of solvent used can be varied to produce a composition containing between 95 and 20% solids. Generally, the higher solids compositions are preferred especially when the product is to be used in water borne coatings systems.

In accordance with the present invention it is preferred to carry out the reaction under a blanket of an inert gas, such as nitrogen.

The compositions of the products of the process of this invention are relatively independent of the order of addition of the reactants and the solvent(s), and, whether the process is run in batch or continuously. While it is preferable to combine the reactants and solvent(s) at room temperature, if they form a homogeneous solution at room temperature, and then heat them to the process temperature, one reactant can be heated to the process temperature and the other reactant, in solvent, can be added to it, or, one reactant, in solvent, can be heated to the process temperature and the other reactant can be added to it. In the most preferred embodiment of the process of this invention, the previously described uretidione polyisocyanate and solvent, if used, is heated to the reaction temperature and then the previously described polyalcohol, polyalcohol mixture or mixture of polyalcohols and mono-ols is added to the isocyanate at as rapid a rate as possible, that rate being slow enough to maintain the homogeneity of the reactant solution.

By adding and reacting out the mono-ol, first, and then adding the polyalcohol, it is possible to prepare products of this invention which have relatively high levels of oligomer chains terminated by one hydroxyl group and one (cyclo) aliphatic residue group.

The progress of the urethane reaction process for preparing the polyuretidione polyurethanes of this invention can be conveniently tracked by the disappearance of the isocyanate group by IR spectroscopy or titration. The latter is preferred when the above-mentioned two step process is used to prepare (cyclo)aliphatic residue terminated compositions.

In the urethane reaction, the parameters of time, temperature and catalyst loading must be controlled to avoid the loss of product uretidione content through addition of the alcohol to the ring (to give an allophanate) and through complete cleavage of the uretidione ring. In the absence of catalyst, the reaction temperatures used in this process must be less than 120° C. while temperatures above 40° C. must be used to drive the reaction of the alcohol with the isocyanate at a reasonable rate. Thus, the preferred reaction temperature range is between 60° and 100° C., with a most preferred range of from about 70 to about 90° C. At these temperatures, the reaction is complete in about 8 to 16 hours, although in systems containing high levels of secondary alcohols, reaction times of 24 hours may be required.

However, in the absence of catalyst, the reaction times required to consume essentially all of the isocyanate groups are too long to be practically useful. This is especially true in the preparation of the (cyclo)aliphatic group terminated polyuretidione polyurethanes of this invention wherein essentially equivalent amounts of hydroxyl and isocyanate group are present in the reaction solution. Thus, it is preferable to use a catalyst to shorten the reaction times. While, in principle, almost any catalyst known to promote the urethane reaction may be used (several are listed, below), it is more preferable to use one that is readily available and that can be easily deactivated so as to avoid product stability problems. Generally, stannous carboxylate based catalysts, such as stannous octoate and naphthenate, are most preferred. Catalyst levels of 0.001 to 0.1% (based on the polyuretidione polyisocyanate charge) can be used. Levels of 0.01 to 0.05% are preferred.

In the presence of catalysts, lower reaction temperatures should be used. Generally, temperatures must be less than 100° C. to reduce the amount of reaction that can occur between the uretidione ring and the hydroxyl group. Temperatures above 30° C. must be used to drive the reaction of the alcohol with the isocyanate at a reasonable rate. Thus, the preferred reaction temperature range, in the presence of a catalyst, is between about 60° and 90° C., with a most preferred range of from about 65° to about 85° C. At these temperatures, the reaction is complete in about 4 to 6 hours.

After essentially all of the isocyanate has been consumed, the stannous carboxylate catalyst can be deactivated by oxidation or hydrolysis. Thus, oxygen (air), peroxides and/ or water (in essentially stoichiometric quantities based on the amount of catalyst used) can be added to the reaction solution to stop the reaction and stabilize the product. Depending on solvent compatibility, water is the preferred reagent for quenching the catalyst.

As stated above, the preferred compositions of this invention contain little, if any, residual isocyanate groups. Generally, it is found that when only secondary alcohol groups are present in the reaction solution, the time required to completely consume all of the isocyanate groups can be longer than preferred. In these cases (when the NCO content is less than about 1%), small amounts of dialkyl amines can be added to the reaction to immediately cap those remaining isocyanates. The secondary amines, such as diethyl, more preferably dibutyl amine, are most useful because they do not degrade the desired coating system compatibility of the product and are very slow to react with the uretidione ring.

The polyurethane polyuretidione compositions of this invention can be formulated into a variety of water and solvent borne coatings systems, including two component systems, and pseudo-one component systems wherein only the required amount of catalyst is added to formulation just prior to application. Co-reactants suitable for use with these new curatives should contain at least two uretidione reactive groups per molecule of co-reactant. The preferred co-reactants are those well known in polyurethane coatings technology, including, for example: polyamines, including those in a blocked form, for example, polyketimines, polyaldimines or oxazolidines; organic polyhydroxyl compounds, in particular, organic polyhydroxypolyesters, polyhydroxypolyethers, polyhydroxypolyacrylates, and combinations thereof. Optionally, low molecular weight polyhydric alcohols suitably employed as co-reactants for the polyurethane polyuretidiones of this invention.

A useful aspect of this invention is that under the preferred conditions, the final cure of the films using the compositions of this invention can be controlled so that the uretidione ring is opened but not completely cleaved. Thus, depending on the coreactant used, biuret and allophanate linkages can be formed, not urea or urethane linkages. Therefore, the uretidione rings serve as true crosslink points and acceptable films can be prepared using difunctional coreactants. The amount of the polyurethane polyuretidiones employed in the composition of the present invention is suitably selected to provide a molar ratio of uretidione groups to uretidione-reactive groups of from about 0.8:1 to about 3:1, preferably from about 1.0:1 to about 2.0:1.

To accelerate hardening, the coating compositions may contain known polyurethane catalysts, e.g., tertiary amines such as triethylamine, pyridine, methyl pyridine, benzyl dimethylamine, N,N'-dimethylamino- cyclohexane, N-methylpiperidine, pentamethyl diethylene triamine, 1,4-diaza-bicyclo-2,2,2-octane, and N,N'-dimethyl piperazine; or metal salts such as iron (III)-chloride, zinc chloride, zinc-2-ethyl caproate, tin(II)-ethyl caproate, dibutyltin(IV) dilaurate, and molybdenum glycolate. Depending on the reactivity of the coreactant and the amount of catalyst used, heat may also be needed to complete the cure of the coating in an acceptable period of time. However, cure temperatures above 140° C. should be avoided, as a significant portion of the uretidione rings may be completely cleaved. This will reduce the crosslink density of the film, upset the reactant/ coreactant balance and degrade the properties of the finished film.

The coating compositions may also contain other additives such as pigments, dyes, fillers, leveling agents, and solvents. The coating compositions may be applied to the substrate to be coated in solution or from the melt by conventional methods such as painting, rolling, pouring, or spraying.

The coating compositions containing the polyurethane polyuretidiones, according to this invention, provide coatings which adhere surprisingly well to a metallic substrate, and are particularly light-fast, color stable in the presence of heat, and are very resistant to abrasion. Furthermore, they are characterized by high hardness, elasticity, very good resistance to chemicals, high gloss, excellent weather resistance, and good pigmenting properties. The polyurethane polyuretidiones according to this invention also possess good compatibility with highly branched polyester resins.

The invention is further illustrated but is not intended to be limited by the following examples in which all parts and percentages are by weight, and all molecular weights are number average molecular weights, unless otherwise specified.

EXAMPLES

Unless otherwise noted: solution viscosities were measured at 25° C.; and, uretidione and urethane contents are calculated on a 100% solids basis.

EXAMPLE 1A
Preparation of a Uretidione Polyisocyanate

To a 1000 ml 3-neck flask equipped with a gas bubbler, mechanical stirrer, thermometer, and condenser was added 500 grams of hexamethylene diisocyanate. The nitrogen flow, stirring and heating were started. When the temperature of the diisocyanate reached 75° C., 1.2 grams of tributyl phosphine was added and the dimerization was run at 75° C. When about 30% of the HDI had been converted to uretidione and isocyanurate oligomers, the reaction was stopped by adding 1 molar equivalent (about 1.2 g) of methyl tosylate, followed by an additional 2 hours of heating at 85° C. The excess monomer was then removed by thin film evaporation to provide 150 grams of an almost colorless, clear liquid having a viscosity of 75 cp (25° C.), an NCO content of 23.3%, a free HDI monomer content of 0.2% and an estimated functionality of 2.2 by SFC analysis.

EXAMPLE 1B
Preparation of an Allophanate-Modified Uretidione Polyisocyanate

To a 1000 ml 3-neck flask equipped with a gas bubbler, mechanical stirrer, thermometer, and condenser was added 500 grams of hexamethylene diisocyanate. The nitrogen flow, stirring and heating were started. When the temperature of the diisocyanate reached 75° C., 1.2 grams of tributyl phosphine was added and a dimerization reaction was run at a temperature of 75° C. When about 5% of the HDI had been converted to uretidione and isocyanurate oligomers, 23.2 grams of a 750 molecular weight poly(ethylene glycol) monomethyl ether was added to the reaction solution over a period of 2 hours. When about 30% of the HDI had been converted to allophanate, uretidione and isocyanurate oligomers, the reaction was stopped by adding 1 molar equivalent (about 1.2 g) of methyl tosylate, followed by an additional 2 hours of heating at 85° C. The excess monomer was then removed by thin film evaporation to provide 170 grams of an almost colorless, clear liquid having an NCO content of 20.0% and a free HDI monomer content of 0.2%.

EXAMPLE 2
(Alkyl Terminated Polyuretidione Polyurethanes Processes)

2A (Diol Added First, No Catalyst): To a 500 ml 3-neck flask equipped with a gas bubbler, mechanical stirrer, thermometer, and condenser was added 78.0 grams of the uretidione polyisocyanate of Example 1A, 100 grams of butyl acetate and 15.6 grams of 1,3-butane diol. The stirring and heating were started and the nitrogen was turned on sufficiently to maintain a positive pressure over the reaction solution. The temperature was held at 85° C. for four hours and then 6.4 grams of 2-butanol was added. The reaction was continued at 85° C. for eight more hours at which time the isocyanate peak in the IR was no longer detected. The resulting almost colorless, clear liquid had a viscosity of 507 cp (25° C.).

2B (Alcohols Added At Once, No Catalyst): To a 500 ml 3-neck flask equipped with a gas bubbler, mechanical stirrer, thermometer, and condenser was added 78.0 grams of the uretidione polyisocyanate of Example 1A, 100 grams of butyl acetate, 6.4 grams of 2-butanol and 15.6 grams of 1,3-butane diol. The stirring and heating were started and the nitrogen was turned on sufficiently to maintain a positive pressure over the reaction solution. The temperature was held at 85° C. for fourteen hours at which time the isocyanate peak in the IR was no longer detected. The resulting almost colorless, clear liquid had a viscosity of 505 cp (25° C.).

2C (Diol Added First, Catalyst): To a 500 ml 3-neck flask equipped with a gas bubbler, mechanical stirrer, thermometer, and condenser was added 78.0 grams of the uretidione polyisocyanate of Example 1A, 100 grams of butyl acetate, 15.6 grams of 1,3-butane diol and 0.2 grams of 10% stannous naphthenate in mineral spirits. The stirring and heating were started and the nitrogen was turned on sufficiently to maintain a positive pressure over the reaction solution. The temperature was held at 75° C. for one hour and then 6.4 grams of 2-butanol was added. The reaction was continued at 75° C. for three more hours at which time the isocyanate peak in the IR was no longer detected. The catalyst was quenched by the addition of 0.1 gram of water. The resulting almost colorless, clear liquid had a viscosity of 511 cp (25° C).

2D (Alcohols Added At Once, Catalyst): To a 500 ml 3-neck flask equipped with a gas bubbler, mechanical stirrer, thermometer, and condenser was added 78.0 grams of the uretidione polyisocyanate of Example 1A, 100 grams of butyl acetate, 6.4 grams of 2-butanol, 15.6 grams of 1,3-butane diol and 0.2 grams of 10% stannous naphthenate in mineral spirits. The stirring and heating were started and the nitrogen was turned on sufficiently to maintain a positive pressure over the reaction solution. The temperature was held at 75° C. for four hours at which time the isocyanate peak in the IR was no longer detected. The catalyst was quenched by the addition of 0.1 gram of water. The resulting almost colorless, clear liquid had a viscosity of 521 cp (25° C.).

These example polyuretidione polyurethanes were prepared at an equivalents ratio of 4:1:5 (Diol:Monol:Isocyanate) and contained 14.5% uretidione and 25.5% urethane on a solvent free basis. As can be seen from the results presented hereinabove, the viscosities of these products are essentially the same and that they essentially independent of the order of alcohol addition and the presence of catalyst. However the reaction can be run at a lower temperature and with reduced reaction time in the presence of a catalyst, if desired.

EXAMPLE 3
Preparation of Low Viscosity Alkyl-Terminated Polyuretidione Polyurethanes A series of alkyl terminated polyuretidione polyurethanes were prepared with differing combinations of mono-ols and diols at various equivalent ratios using the process described in Example 2C. The composition and viscosities of the resulting products are listed in Table 1.

TABLE 1

Alkyl Residue Terminated Polyuretidione Polyurethanes Composition and Properties

| Ex. #3 | Diol | Monol | Relative Equivalents | | | On Solids | | Solution Viscosity |
|---|---|---|---|---|---|---|---|---|
| | | | Diol | Mono | Iso | % Uretidione | % Urethane | cp 25° C. |
| a | 1,3-Butane | 2-Butanol | 2 | 1 | 3 | 14.3 | 25.1 | 77 |
| b | 1,3-Butane | 2-Butanol | 4 | 1 | 5 | 14.5 | 25.5 | 511 |
| c | 1,3-Butane | 2-Butanol | 6 | 1 | 7 | 14.7 | 25.7 | 1150 |
| d | 1,3-Butane | 2-Butanol | 8 | 1 | 9 | 14.7 | 25.8 | 2127 |
| e | 1,3-Butane Diol | 2-Ethyl-1-hexanol | 4 | 1 | 5 | 13.9 | 24.3 | 218 |
| f | 2-Ethyl-1,3-hexane Diol | 2-Butanol | 4 | 1 | 5 | 13.3 | 23.3 | 165 |
| g | 2-Ethyl-1,3-hexane Diol | 2-Ethyl-1-hexanol | 2 | 1 | 3 | 12.3 | 21.7 | 40 |
| h | 2-Ethyl-1,3-hexane Diol | 2-Ethyl-1-hexanol | 4 | 1 | 5 | 12.7 | 22.3 | 135 |
| i | 2-Ethyl-1,3-hexane Diol | 2-Ethyl-1-hexanol | 6 | 1 | 7 | 12.9 | 22.6 | 348 |
| j | 2-Ethyl-1,3-hexane Diol | 2-Ethyl-1-hexanol | 8 | 1 | 9 | 12.9 | 22.7 | 845 |
| k | 2-Methyl-1,3-propane Diol | 2-Ethyl-1-hexanol | 4 | 1 | 5 | 13.9 | 24.3 | 1475 |
| i | 2,2-Dimethyl-1,3-propane | 2-Ethyl-1-hexanol | 4 | 1 | 5 | 13.6 | 23.8 | 235 |
| m | 2-Methyl-1,3-propane Diol | 2-Ethyl-1-hexanol | 4 | 1 | 5 | 13.9 | 24.3 | 275 |

EXAMPLE 4
(Hydroxyl Terminated Polyuretidione Polyurethane Viscosities)

A series of hydroxyl terminated polyuretidione polyurethanes were prepared with different diols at various equivalent ratios using the process described in Example 2D (with the omission of the mono-ol addition). The composition and viscosities of the resulting products are listed in Table 2.

COMPARATIVE EXAMPLE A
(Primary Hydroxyl Terminated Polyuretidione Polyurethanes)

For comparison with similar products of Example 4, a series of hydroxyl terminated polyuretidione polyurethanes were prepared with different all primary hydroxyl diols at an alcohol to isocyanate equivalents ratio of 5:4 using the process described in Example 4. The compositions of the resulting products are listed in Table 2. Their viscosities could not be measured at 25° C. as they were all waxes at that temperature. Thus, polyuretidione polyurethanes derived from high levels primary alcohols are not suitable for use in coatings formulations without the addition of unacceptably large quantities of organic solvents.

TABLE 2

Hydroxy Alkyl Residue Terminated Polyuretidione Polyurethanes Composition and Properties

| Ex. # | Diol | Relative Equivalents | | On Solids | | Solution Viscosity |
|---|---|---|---|---|---|---|
| | | Diol | Iso | % Ure-tidione | % Ure-thane | cp 25° C. |
| 4a | 1,3-Butane Diol | 5 | 4 | 14.2 | 24.9 | 126 |
| 4b | 1,3-Butane Diol | 6 | 5 | 14.3 | 25.2 | 251 |

TABLE 2-continued

Hydroxy Alkyl Residue Terminated Polyuretidione Polyurethanes Composition and Properties

| Ex. # | Diol | Relative Equivalents | | On Solids | | Solution Viscosity |
|---|---|---|---|---|---|---|
| | | Diol | Iso | % Ure-tidione | % Ure-thane | cp 25° C. |
| 4c | 1,3-Butane Diol | 7 | 6 | 14.4 | 25.3 | 670 |
| 4d | 2-Methyl-1,3-propane Diol | 5 | 4 | 14.2 | 24.9 | 155 |
| 4e | 2-Methyl-1,3-propane Diol | 6 | 5 | 14.3 | 25.2 | 284 |
| 4f | 2,2-Dimethyl-1,3-propane Diol | 5 | 4 | 13.7 | 24.0 | 194 |
| 4g | 2,2-Dimethyl-1,3-propane Diol | 6 | 5 | 13.9 | 24.3 | 385 |
| 4h | 2,2-Dimethyl-1,3-propane Diol | 7 | 6 | 14.0 | 24.5 | 725 |
| 4i | 2,5-Hexane Diol | 5 | 4 | 13.2 | 23.2 | 585 |
| 4j | Dipropylene Glycol | 5 | 4 | 12.7 | 22.3 | 194 |
| 4k | 2-Ethyl-1,3-hexane Diol | 5 | 4 | 12.4 | 21.7 | 195 |
| 4l | 2-Ethyl-1,3-hexane Diol | 6 | 5 | 12.5 | 22.0 | 312 |
| 4m | 2-Ethyl-1,3-hexane Diol | 7 | 6 | 12.7 | 22.2 | 560 |
| A1 | 1,4-Butane Diol | 5 | 4 | 14.2 | 24.9 | Waxy Solid |
| A2 | 1,6-Hexane Diol | 5 | 4 | 13.2 | 23.2 | Waxy Solid |
| A3 | 1,8-Octane Diol | 5 | 4 | 12.4 | 21.7 | Waxy Solid |

EXAMPLE 5
(Hydrophile Modified Polyuretidione Polyurethanes)

5A (Uretidione Polyisocyanate, No Catalyst): To a 500 ml 3-neck flask equipped with a gas bubbler, mechanical stirrer, thermometer, and condenser was added 60.0 grams of the uretidione polyisocyanate of Example 1A, 100 grams of 2-butanone and 13.4 grams of a 750 molecular weight poly(ethylene glycol) monomethyl ether. The stirring and heating were started and the nitrogen was turned on sufficiently to maintain a positive pressure over the reaction solution. The temperature was held at 85° C. for eight hours and then 12.6 grams of 2,2-dimethyl-1,3-propane diol and 14.0 grams 2-ethyl-1-hexanol was added. The reaction was continued at 85° C. for eight more hours at which time the isocyanate peak in the IR was no longer detected. The resulting almost colorless, clear liquid had a viscosity of 45 cp (25° C.).

5B (Allophanate Modified Uretidione Polyisocyanate, No Catalyst): To a 500 ml 3-neck flask equipped with a gas bubbler, mechanical stirrer, thermometer, and condenser was added 73.4 grams of the poly(ethylene glycol) allophanate modified uretidione polyisocyanate of Example 1B, 100 grams of 2-butanone, 12.6 grams of 2,2-dimethyl-1,3-propane diol and 14.0 grams 2-ethyl-1-hexanol. The stirring and heating were started and the nitrogen was turned on sufficiently to maintain a positive pressure over the reaction solution. The temperature was held at 85° C. for fourteen hours at which time the isocyanate peak in the IR was no longer detected. The catalyst was quenched by the addition of 0.1 gram of water. The resulting almost colorless, clear liquid had a viscosity of 60 cp (25° C.).

5C (Uretidione Polyisocyanate, Catalyst): To a 500 ml 3-neck flask equipped with a gas bubbler, mechanical stirrer, thermometer, and condenser was added 60.0 grams of the uretidione polyisocyanate of Example 1A, 100 grams of 2-butanone, 13.4 grams of a 750 molecular weight poly (ethylene glycol) monomethyl ether and 0.2 grams of 10% stannous naphthenate in mineral spirits. The stirring and heating were started and the nitrogen was turned on sufficiently to maintain a positive pressure over the reaction solution. The temperature was held at 75° C. for one hour and then 12.6 grams of 2,2-dimethyl-1,3-propane diol and 14.0 grams 2-ethyl-1-hexanol was added. The reaction was continued at 75° C. for four more hours at which time the isocyanate peak in the IR was no longer detected. The catalyst was quenched by the addition of 0.1 gram of water. The resulting almost colorless, clear liquid had a viscosity of 55 cp (25° C.).

These example hydrophile modified polyuretidione polyurethanes were prepared at an equivalents ratio of 2:1:3 (Diol:Monol:Isocyanate) and contained 11.8% uretidione and 20.7% urethane on a solvent free basis. As can be seen from above, the viscosities of the products are essentially the same and essentially independent of the order of alcohol addition and the presence of catalyst. However the reaction can be run at a lower temperature and with reduced reaction time with use of a catalyst. A 10 gram sample of each product was added to a bottle containing 95 grams of water. The bottles were sealed and shaken by hand to give opaque, milky dispersions. These dispersions were stable, showing no evidence of precipitation for at least two months.

EXAMPLE 6
(Solvent Borne Coatings)

Two sets of coatings were prepared using aliphatic diamines as crosslinking agents with several alkyl terminated polyuretidione polyurethanes of Example 3 at varying amine to uretidione equivalent ratios.

DIAMINE #1: Isophorone diamine (Luxam IPD, product of Olin Corp.),equivalent weight=85.2.
DIAMINE #2: H12MDA (Amicure PACM, product of Air Products and Chemicals, Inc.), equivalent weight=105.2.

The test panels for coatings property measurements were prepared by the draw-down method onto phosphatized 4" by 12" cold roll steel panels. They were then allowed to cure at room temperature for 14 days.

The formulation compositions and coating physical properties using Diamine #1 are shown in Table 3A, the data for coatings using Diamine #2 are shown in Table 3B. These data demonstrate that solvent borne formulations prepared using the polyuretidione polyurethanes of the present invention will yield high quality films.

TABLE 3A

SOLVENT BORNE FORMULATIONS and PHYSICAL PROPERTIES OF FILMS OF THIS INVENTION
IPDA CURE

| FORMULATION #6 | a | b | c | d | e | f | g | h | i |
|---|---|---|---|---|---|---|---|---|---|
| Polyuretidione Polyurethane | | | | | | | | | |
| Example # | 3b | 3b | 3b | 3h | 3h | 3i | 3i | 3j | 3j |
| Grams | 13.6 | 20.3 | 27.1 | 15.6 | 31.1 | 15.4 | 30.7 | 15.3 | 30.5 |
| Equivalents Ratio, Uretidione:Amine | 1:1 | 1.5:1 | 2:1 | 1:1 | 2:1 | 1:1 | 2:1 | 1:1 | 2:1 |
| Grams Amine | 1 | 1 | 1 | 1 | 1 | 1 | 1 | 1 | 1 |
| Tack Free Time, min | 10 | 10 | 20 | 10 | 20 | 10 | 20 | 10 | 10 |
| FILM PROPERTIES | | | | | | | | | |
| Gloss | | | | | | | | | |
| 20° | 83 | 87 | 75 | 86 | 87 | 82 | 87 | 89 | 85 |
| 60° | 104 | 104 | 101 | 104 | 104 | 101 | 103 | 101 | 104 |
| Pencil Hardness | 4 | 4 | 4 | 4 | 4 | 4 | 4 | 4 | 4 |
| Mandrel Bend | pass | pass | pass | pass | pass | pass | pass | pass | pass |
| Impact, in/lb | | | | | | | | | |
| Direct | >160 | >160 | >160 | >160 | 140 | >160 | >160 | >160 | >160 |
| Reverse | >160 | >160 | >160 | >160 | 120 | >160 | >160 | >160 | >160 |
| Chemical & Solvent Resistance, 30 Min | | | | | | | | | |
| MEK | pass | slmrk | slmrk | mark | slmrk | slmrk | pass | mark | slmrk |

TABLE 3A-continued

SOLVENT BORNE FORMULATIONS
and PHYSICAL PROPERTIES OF FILMS OF THIS INVENTION
IPDA CURE

| FORMULATION #6 | a | b | c | d | e | f | g | h | i |
|---|---|---|---|---|---|---|---|---|---|
| Xylene | pass | slmrk | slmrk | slmrk | slmrk | slmrk | pass | slmrk | pass |
| 10% Acetic Acid | pass | pass | pass | pass | pass | pass | pass | pass | pass |
| 10% HCl | pass | pass | pass | pass | pass | pass | pass | pass | pass |
| 10% NaOH | pass | pass | pass | pass | pass | pass | pass | pass | pass |

TABLE 3B

SOLVENT BORNE FORMULATIONS
and PHYSICAL PROPERTIES OF FILMS OF THIS INVENTION
Amicure PCAM CURE

| FORMULATION #6 | j | k | l | m | n | o | p | q |
|---|---|---|---|---|---|---|---|---|
| Polyuretidione Polyurethane | | | | | | | | |
| Example # | 3b | 3b | 3h | 3h | 3i | 3i | 3j | 3j |
| Grams | 11.0 | 22.0 | 12.6 | 25.2 | 12.4 | 24.9 | 12.3 | 24.7 |
| Equivalents Ratio, Uretidione:Amine | 1:1 | 2:1 | 1:1 | 2:1 | 1:1 | 2:1 | 1:1 | 2:1 |
| Grams Amine | 1 | 1 | 1 | 1 | 1 | 1 | 1 | 1 |
| Tack Free Time, min | 10 | 25 | 25 | 25 | 15 | 25 | 10 | 20 |
| FILM PROPERTIES | | | | | | | | |
| Gloss | | | | | | | | |
| 20° | 80 | 90 | 83 | 89 | 81 | 89 | 88 | 85 |
| 60° | 100 | 105 | 101 | 102 | 101 | 101 | 106 | 103 |
| Pencil Hardness | 4 | 4 | 4 | 4 | 4 | 4 | 4 | 4 |
| Mandrel Bend | pass | pass | pass | pass | pass | pass | pass | pass |
| Impact, in/lb | | | | | | | | |
| Direct | >160 | >160 | >160 | 140 | >160 | >160 | >160 | >160 |
| Reverse | >160 | >160 | >160 | 120 | >160 | >160 | >160 | >160 |
| Chemical & Solvent Resistance, 30 Min | | | | | | | | |
| MEK | pass | slmr | pass | slmrk | pass | pass | pass | slmrk |
| Xylene | pass | pass | slmr | slmrk | pass | pass | pass | pass |
| 10% Acetic Acid | pass | pass | pass | pass | pass | pass | pass | pass |
| 10% HCl | pass | pass | pass | pass | pass | pass | pass | pass |
| 10% NaOH | pass | pass | pass | pass | pass | pass | pass | pass |

EXAMPLE 7

(Water Borne Coatings)

A set of coatings were prepared using ethylene diamine (equivalent weight=30.1) as a crosslinking agent with the hydrophile modified alkyl terminated polyuretidione polyurethanes of Example 5.

The test panels for coatings property measurements were prepared by the draw-down method onto phosphatized 4" by 12" cold roll steel panels. They were then allowed to cure at room temperature for 14 days.

The formulation compositions and coating physical properties are shown in Table 4. These data demonstrate that solvent water formulations prepared using the polyuretidione polyurethanes of the present invention will yield high quality films.

TABLE 4

WATER BORNE FORMULATIONS and PHYSICAL
PROPERTIES OF FILMS OF THIS INVENTION
Ethylene Diamine CURE

| FORMULATION #7 | a | b | c |
|---|---|---|---|
| Polyuretidione Polyurethane | | | |
| Example # | 5a | 5b | 5c |
| Grams | 31.2 | 31.6 | 31.4 |
| Water, grams | 250 | 252 | 251 |
| Equivalents Ratio, Uretidione:Amine | 1:1.5 | 1:1.5 | 1:1.5 |
| Grams Amine | 1 | 1 | 1 |
| FILM PROPERTIES | | | |
| Gloss | | | |
| 20° | 70 | 75 | 77 |
| 60° | 92 | 94 | 96 |
| Pencil Hardness | 3B | 4 | 4 |
| Mandrel Bend | pass | pass | pass |

TABLE 4-continued

WATER BORNE FORMULATIONS and PHYSICAL
PROPERTIES OF FILMS OF THIS INVENTION
Ethylene Diamine CURE

| FORMULATION #7 | a | b | c |
|---|---|---|---|
| Impact, in/lb | | | |
| Direct | >160 | >160 | >160 |
| Reverse | >160 | >160 | >160 |
| Chemical & Solvent Resistance, 30 Min | | | |
| MEK | slmrk | mark | slmrk |
| Xylene | slmrk | mark | slmrk |
| 10% Acetic Acid | slmrk | pass | pass |
| 10% HCl | pass | pass | pass |
| 10% NaOH | pass | pass | pass |

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A coating composition comprising an active hydrogen-containing component and a polyuretidione polyurethane component that is free of carbonate groups and carboxylic acid ester groups, said polyuretidione polyurethane component comprising:
   (a) from 5% to 20%, by weight, of uretidione groups, calculated as $(NCO)_2$ having a molecular weight of 84,
   (b) from 10 to 30%, by weight, of urethane groups, calculated as $NHCO_2$ having a molecular weight of 59,
   (c) less than 2%, by weight, of free isocyanate groups, calculated as NCO having a molecular weight of 42, and
   (d) less than 7%, by weight, of isocyanurate groups, calculated as $(NCO)_3$ having a molecular weight of 126.

2. The coating composition of claim 1 wherein component (a) is present in an amount of from 7% to 17%, component (b) is present in an amount of from 15% to 27%, component (c) is present in an amount of less than 1%, and component (d) is present in an amount of less than 5%, based on the weight of the polyuretidione polyurethane.

3. The coating composition of claim 1 wherein said polyuretidione polyurethane is further characterized by containing: (i) an average of 3 to 10 uretidione rings per oligomer chain; and, (ii) less thank 1 mol percent of oligomer chains containing one or fewer uretidione rings.

4. A process for preparing a coating composition which comprises contacting an active hydrogen-containing component and a polyuretidione polyurethane component that is free of carbonate groups and carboxylic acid ester groups, said composition comprising, based on the weight of the polyuretidione polyurethane:
   (a) from 5% to 20%, by weight, of uretidione groups, calculated as $(NCO)_2$ having a molecular weight of 84,
   (b) from 10 to 30%, by weight, of urethane groups, calculated as $NHCO_2$ having a molecular weight of 59,
   (c) less than 2%, by weight, of free isocyanate groups, calculated as NCO having a molecular weight of 42, and
   (d) less than 7%, by weight, of isocyanurate groups, calculated as $(NCO)_3$ having a molecular weight of 126,
said polyuretidione polyurethane being prepared by a process comprising reacting, at an equivalent ratio of isocyanate groups to hydroxyl groups of 1.0:1 to 0.7:1, a reaction mixture comprising:
   (A) a uretidione group-containing polyisocyanate having an average isocyanate functionality of between 2.0 and 2.4,
   (B) a diol, or a mixture of diols, that is free of carbonate groups and free of carboxylic acid ester groups, and has an average molecular weight of more than 76 but less than 676, with the proviso that, of the hydroxyl groups present, more than 40% of them are secondary hydroxyl groups or are in a position alpha to an alkyl chain branch point, and
   (C) not more than 40% by weight of mono-hydroxyl compound, based on the total weight of components (B) and (C) in said reaction mixture.

5. The process of claim 4 wherein component (a) is present in an amount of from 7% to 17%, component (b) is present in an amount of from 15% to 27%, component (c) is present in an amount of less than 1%, and component (d) is present in an amount of less than 5%, based on the weight of the polyuretidione polyurethane.

6. The process of claim 4 wherein said polyuretidione polyurethane composition is further characterized by containing: (i) an average of 3 to 10 uretidione rings per oligomer chain; and, (ii) less than 1 mol percent of oligomer chains containing one or fewer uretidione rings.

7. The process of claim 4 wherein said mono-hydroxyl compound is selected from the group consisting of alcohols containing one or more of the following: poly(oxyethlyene) chains, pyrrolidinone groups, and acidic functionalities.

8. The process of claim 4 wherein said coating composition further comprises water or an organic solvent.

9. A method of coating a substrate which comprises contacting the substrate with a coating composition prepared by contacting an active hydrogen-containing component and a polyuretidione polyurethane component that is free of carbonate groups and carboxylic acid ester groups, said composition comprising, based on the weight of the polyuretidione polyurethane:
   (a) from 5% to 20%, by weight, of uretidione groups, calculated as $(NCO)_2$ having a molecular weight of 84,
   (b) from 10 to 30%, by weight, of urethane groups, calculated as $NHCO_2$ having a molecular weight of 59,
   (c) less than 2%, by weight, of free isocyanate groups, calculated as NCO having a molecular weight of 42, and
   (d) less than 7%, by weight, of isocyanurate groups, calculated as $(NCO)_3$ having a molecular weight of 126, said polyuretidione polyurethane being prepared by a process comprising reacting, at an equivalent ratio of isocyanate groups to hydroxyl groups of 1.0:1 to 0.7:1, a reaction mixture comprising:
      (A) a uretidione group-containing polyisocyanate having an average isocyanate functionality of between 2.0 and 2.4,
      (B) a diol, or a mixture of diols, that is free of carbonate groups and free of carboxylic acid ester groups, and has an average molecular weight of more than 76 but less than 676, with the proviso that, of the hydroxyl groups present, more than 40% of them are secondary hydroxyl groups or are in a position alpha to an alkyl chain branch point, and (C) not more than 40% by weight of mono-hydroxyl compound, based on the total weight of components (B) and (C) in said reaction mixture.

10. The method of claim 9 wherein component (a) is present in an amount of from 7% to 17%, component (b) is present in an amount of from 15% to 27%, component (c) is present in an amount of less than 1%, and component (d) is present in an amount of less than 5%, based on the weight of the polyuretidione polyurethane.

11. The method of claim 9 wherein said polyuretidione polyurethane composition is further characterized by containing: (i) an average of 3 to 10 uretidione rings per oligomer chain; and, (ii) less than 1 mol percent of oligomer chains containing one or fewer uretidione rings.

12. The process of claim 9 wherein said mono-hydroxyl compound is selected from the group consisting of alcohols containing one or more of the following: poly(oxyethlyene) chains, pyrrolidinone groups, and acidic functionalities.

13. The method of claim 9 wherein said coating composition further comprises water or an organic solvent.

* * * * *